United States Patent
Corey et al.

(10) Patent No.: US 10,726,172 B2
(45) Date of Patent: Jul. 28, 2020

(54) SYSTEMS AND METHODS TO ACHIEVE TAILORED FLUID AND ENERGY INTERACTION THROUGH SURFACE TEXTURING

(71) Applicant: HARRIS CORPORATION, Melbourne, FL (US)

(72) Inventors: Christopher A. Corey, Palm Bay, FL (US); Erin K. Sharma, Palm Bay, FL (US)

(73) Assignee: HARRIS CORPORATION, Melbourne, FL (US)

( * ) Notice: Subject to any disclaimer, the term of this patent is extended or adjusted under 35 U.S.C. 154(b) by 435 days.

(21) Appl. No.: 15/646,913

(22) Filed: Jul. 11, 2017

(65) Prior Publication Data

US 2018/0293339 A1 Oct. 11, 2018

Related U.S. Application Data

(60) Provisional application No. 62/483,551, filed on Apr. 10, 2017.

(51) Int. Cl.
*G06F 30/20* (2020.01)
*G06F 17/11* (2006.01)
*G06F 111/10* (2020.01)

(52) U.S. Cl.
CPC .............. *G06F 30/20* (2020.01); *G06F 17/11* (2013.01); *G06F 2111/10* (2020.01); *Y02E 60/76* (2013.01); *Y04S 40/22* (2013.01)

(58) Field of Classification Search
None
See application file for complete search history.

(56) References Cited

U.S. PATENT DOCUMENTS 8,177,985 B2  5/2012  Akay et al.
8,302,904 B2 * 11/2012  McKeon ................. B64C 21/10
                                                    244/198

(Continued)

OTHER PUBLICATIONS

Balu, B., et al., "Tunability of the Adhesion of Water Drops on a Superhydrophobic Paper Surface via Selective Plasma Etching," Journal of Adhesion Science and Technology 23 (2009), 361-380, copyright Koninklijke Brill NV, Leiden, 2009, DOI:10.1163/156856108X383547.

(Continued)

*Primary Examiner* — Suzanne Lo
(74) *Attorney, Agent, or Firm* — Fox Rothschild LLP; Robert J. Sacco

(57) ABSTRACT

Systems and methods for tailoring fluid and energy interaction through surface texturing. The methods comprise: receiving behavior input data specifying known or modeled interactions between a material and pre-solved solution surfaces, discrete input data specifying parameters of a surface to be textured, and continuous input data specifying ranges of values for environmental characteristics that the surface is to be subjected to during use; transforming the behavior input data into a composite response surface comprising a weighted combination of the pre-solved solution surfaces generated based on the discrete input data and the continuous input data; determining an optimized surface texture for the surface based on the composite response surface and desired behavior data specifying a desired interaction between the material and the surface to be textured; and outputting the optimized surface texture (e.g., to a surface texturing machine) so that the optimized surface texture is applied to the surface.

18 Claims, 6 Drawing Sheets

(56) References Cited

U.S. PATENT DOCUMENTS

| | | | |
|---|---|---|---|
| 8,790,594 B2 * | 7/2014 | Hess | B01L 3/502707 |
| | | | 216/67 |
| 2011/0283778 A1 | 11/2011 | Angelescu et al. | |
| 2012/0000853 A1 | 1/2012 | Tuteja et al. | |

OTHER PUBLICATIONS

Kota, A.K., et al., "The Design and Applications of Superomniphobic Surfaces," NPG Asia Materials (2014) 6, e109; DOI:10.1038/am.2014.34, copyright 2014 Nature Publishing Group.

Tao, M., et al., "An Intelligent Superwetting PVDF Membrane Showing Switchable Transport Performance for Oil/Water Separation," Materials Views, Advanced Materials 26, 2943 (2014).

Vorobyev, A.Y., et al., "Multifunctional Surfaces Produced by Femtosecond Laser Pulses," Journal of Applied Physics 117, 033103 (2015); DOIL 10.1063/1.48905616, published by AIP Publishing.

Xia, F., et al., "Bio-Inspired, Smart, Multiscale Interfacial Materials," Adanced Materials, 2008, 20, pp. 2842-2858, copyright 2009 Wiley-VCH Verlag GmbH & Co., KGzA, Weinheim, DOI: 10.1002/adma.200800836.

* cited by examiner

SYSTEMS AND METHODS TO ACHIEVE TAILORED FLUID AND ENERGY INTERACTION THROUGH SURFACE TEXTURING

CROSS-REFERENCE TO RELATED APPLICATIONS

This application claims priority to U.S. Patent Application No. 62/483,551, filed Apr. 10, 2017 and incorporated herein by reference for all purposes.

FIELD

The present document relates to surface texturing. More particularly, the present document relates to systems and methods for designing application specific surface texturing to achieve a tailored fluid and energy interaction.

BACKGROUND

The surface texturing of a device's surface can impact the performance of the device in many ways, particularly as a result of the fluid and energy interaction at the surface. As some examples, improper surface texture can result in icing, contamination, fogging, optical loss, flow resistance, corrosion, and bio fouling of various devices. Exemplary devices which may experience such impacts include radar/telecom antennas, air foils, power transmission lines, pipes (AC, refrigerators), sensors, photovoltaic cells, displays and signs, windows, oil pipelines, coolant cycling, packaging, cooling systems, heating systems, pneumatic system drying, submerged pipes/lines, medical sensors, medical implants, microfluidic cells, maritime hulls, maritime buoys, and bridge supports. The potential impacts and devices are for examples only, and other devices may experience other negative results. As a further complication, most devices have surfaces which may experience multiple negative results.

SUMMARY

The present document concerns systems and methods for tailoring fluid and energy interaction through surface texturing. The methods comprise: receiving, by a computing device, behavior input data specifying known or modeled interactions between a material and a plurality of pre-solved solution surfaces, discrete input data specifying parameters of a surface to be textured, and continuous input data specifying ranges of values for environmental characteristics that the surface is to be subjected to during use; transforming, by the computing device, the behavior input data into a composite response surface comprising a weighted combination of the plurality of pre-solved solution surfaces generated based on the discrete input data and the continuous input data; determining, by the computing device, an optimized surface texture for the surface based on the composite response surface and desired behavior data specifying a desired interaction between the material and the surface to be textured; and outputting the optimized surface texture so that the optimized surface texture is applied to the surface. Notably, the bulk properties of the substrate are unaffected by the application of the optimized surface texture to the surface.

In some scenarios, the behavior input data comprises at least one of a plurality of computer models and empirical data. The continuous input data comprises sensor data generated by sensors disposed in an environment in which a textured substrate is to be used. The weighted combination of the plurality of pre-solved solution surfaces is generated in accordance with mathematical equation ∀ response surfaces $S_{Mechanical}$, $S_{Electromagnetic}$, and $S_{Fluid}$ and ∀ weighting factors $\lambda$ where $\sum_{l=1}^{m} \lambda_l = 1$ ∃ composite surface $S_{composite} \ni S_{composite} =$ $$\lambda_1 S_{Mechanical} + \sum_{l=2}^{n} \lambda_l S_{Electromagnetic} + \sum_{l=n+1}^{m} \lambda_l S_{Fluid}$$

where $S_{Mechanical}$ represents a response surface modeling mechanical behavior of a substrate, $S_{Electromagnetic}$ represents a response surface modeling an electromagnetic response of the substrate, $S_{Fluid}$ represents a response surface modeling a fluid's interaction with the substrate. $S_{composite}$ represents the composite response surface resulting from combining models specifying the substrate's mechanical behavior, electromagnetic response, and interaction with a fluid, $\lambda$ represents a weighting factor, n is a total number of response surfaces modeling the electromagnetic response of the substrate, and m is a total number of response surfaces modeling the fluid's interaction with the substrate.

The optimized surface texture changes a contact angle between a fluid and the surface. The optimized surface texture comprises a single level design or a multi-level design having a hierarchical architecture. In both cases, the surface texture penetrates only partially through a monolithic material. The surface may be retextured.

BRIEF DESCRIPTION OF THE DRAWINGS

The present solution will be described with reference to the following drawing figures, in which like numerals represent like items throughout the figures.

DETAILED DESCRIPTION

Figure 1:
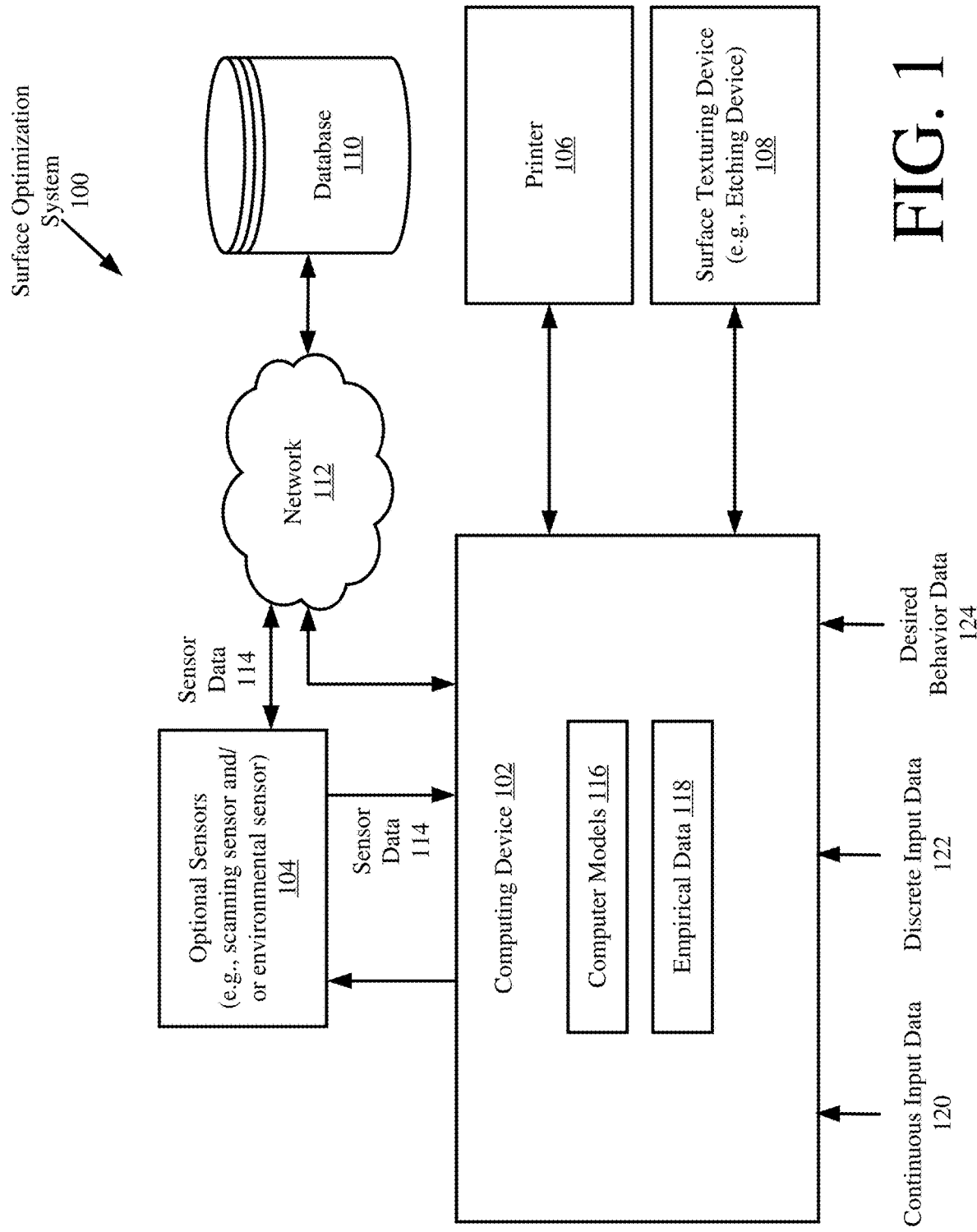
FIG. 1 is an illustration of an exemplary architecture for a surface optimization system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns systems and methods for designing application specific surface texturing to achieve a tailored fluid and energy interaction. The present solution can be used in various applications. For example, the present solution can be used to prevent icing (e.g., on airplane wings, antennas, power transmission lines, AC pipes and/or refrigerator pipes), contamination/fogging (e.g., of sensors, photovoltaic cells, displays, signs and/or windows), corrosion (e.g., of packaging, cooling systems, heating systems and/or pneumatic system drying), optical loss (e.g., by sensors, photovoltaic cells and/or displays), bio fouling (e.g., of sensors, submerged pipes/lines, medical sensors and implants, microfluidic cells, maritime hulls and buoys and/or bridge supports), and/or flow resistance (e.g., oil pipelines, coolant cycling, and/or maritime hulls).

In some scenarios, the present solution is used to prevent biofilm growth on sensor windows by texturing a substrate's surface such that water does not become pinned thereto. The term "pinned", as used herein, refers to the ability of fluids to maintain contact with a surface. Pinned water creates wetting of the surface. Water that is not pinned may roll off of the surface. The primary measurement to determine wettability is the angle between the surface and the surface of a liquid droplet on the surface. This angle is referred to as a contact angle.

In other scenarios, the present solution is used to facilitate the removal of small water droplets from oil via use of a substrate with a textured surface designed to cause water droplets to become pinned thereto and coalesce with other water droplets to form larger water droplets. The larger water droplets can be removed from the oil via an emulsion breaking technique. Emulsion breaking techniques are well known in the art, and therefore will not be described herein. Any known or to be known emulsion breaking technique can be used herein without limitation. For example, oil demulsification can be used to cause breaking of crude oil emulsion into oil and water phases. The present solution is not limited to the particulars of this example.

The present solution is distinguishable from conventional solutions for modifying the interaction of two materials (e.g., fluids and/or solids). In this regard, it should be understood that the conventional solutions involve coating a substrate (e.g., a cellulose substrate such as paper) with a coating material (e.g., adsorbed particles, layers and polymers) different from the substrate material. The coating is prone to wear damage (abrasion, scratch and impact) and has a low heat tolerance. In contrast, the present solution involves texturing a surface of a monolithic (or single) material or substrate that will interface with an outside world. Notably, the surface texturing does not penetrate through the monolithic material, and is performed at a minimum necessary level so that the substrate retains its structural properties and macro properties. The present solution is more robust as compared to the conventional solutions since the surface texturing is significantly less prone to wear damage. Additionally, the textured substrate can be re-textured for a different application, and therefore provides a reusable platform.

Referring to FIG. 1, there is provided an illustration of an exemplary Surface Optimization System ("SOS") 100. SOS 100 is generally configured to generate an optimized surface texture of (or optimized surface geometric design for) a substrate based on various data inputs. The optimized surface texture of the substrate is designed using a novel technique disclosed herein for manipulating interactions between two materials (e.g., metal, ceramics, polymers, air, water, oil, molten metal, and/or detergents). The novel technique will become evident as the discussion progresses. The substrate includes any flexible, semi-rigid or rigid non-porous material. For example, the substrate comprises metal, plastic (e.g., a silicone polymer) or ceramic (e.g., a glass-ceramic). Also, a single surface of the substrate is textured (i.e., the texturing does not penetrate through the monolithic material of the substrate). The texture pattern can have a single level design (e.g., a wave pattern) or multi-level design. The multi-level design may have a hierarchical architecture (e.g., a wavy pattern on a micron scale and a finer texture at a nanometer scale). The present solution is not limited to the particulars of this example.

As shown in FIG. 1, SOS 100 comprises a computing device 102, optional sensors 104, a printer 106, a surface texturing device 108, and a database 110 accessible via a network 112 (e.g., the Internet or Intranet). The computing device 102 is configured to generate and output the optimized surface texture. The optimized surface texture can be output to a user of the computer device via a display and/or the printer 106. Additionally or alternatively, the optimized surface texture is output to a surface texturing device 108 (i.e., a device that directly imparts the determined optimized surface texture on a bulk material). Printers and surface texturing devices are well known in the art, and therefore will not be described herein. Any known or to be known printer and/or surface texture device can be used herein without limitation. In some scenarios, the surface texturing device 108 includes, but is not limited to, a chemical etching device, a laser etching device, a plater, a grinder, a sandblaster, a powder coater, an ultrasonic machine, an electron beam device, a water jet, an abrasive jet machine, an ion etching device, an electrical discharge machine, a particulate sintering device, and/or an additive manufacturing machine.

The optimized surface texture is generated using various information. This information includes, but is not limited to, computer models 116, empirical data 118, sensor data 114, continuous input data 120, discrete input data 122, and/or desired behavior data 124. The particulars of the listed types of information will become more evident as the discussion progresses. The information 114-124 can be stored in a local memory (e.g., memory 212 of FIG. 2) of the computing device 102 and/or in a remote database 110.

In some scenarios, the computer models 116 and empirical data 116 is provided by a software application executing on the computing device. The software application can include, but is not limited to, a free software application entitled Surface Evolver downloadable from a website http://facstaff.susqu.edu/b/brakke/evolver/evolver.html. The information 120-124 is manually input into the computing device 102 by a user via an input device (such as a keyboard, mouse and/or Graphical User Interface ("GUI")). In other scenarios, at least a portion of the continuous input data is determined using the sensor data 114, which is directly or indirectly provided to the computing device by the sensors 104 disposed in an environment in which the textured substrate is to be used. The manner in which this information is used to generate the optimized surface texture will become evident as the discussion progresses.

The sensors 104 can include, but are not limited to, temperature sensors, humidity sensors, scanning sensors, pressure sensors, photo sensors, thermal infrared sensors, and/or optical sensors to detect wavelengths. Each of the listed sensors is well known in the art, and therefore will not be described herein. Any known or to be known sensor can be used herein without limitation. The sensor data 114 includes, but is not limited to, wavelength data, humidity data, temperature data, chemical data, pressure data, and/or spectral response data. The values for wavelength, humidity, temperature, chemical, pressure and spectral response are variable and therefore change over time.

Those skilled in the art will appreciate that the SOS architecture illustrated in FIG. 1 is one possible example of an SOS. However, the present solution is not limited in this regard and any other suitable SOS architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various implementations broadly include a variety of electronic and computer systems. Some implementations may implement functions in two or more specific interconnected hardware modules or devices with related control and data signals communicated between and through the modules, or as portions of an application-specific integrated circuit. Thus, the illustrative system is applicable to software, firmware, and hardware implementations.

Figure 2:
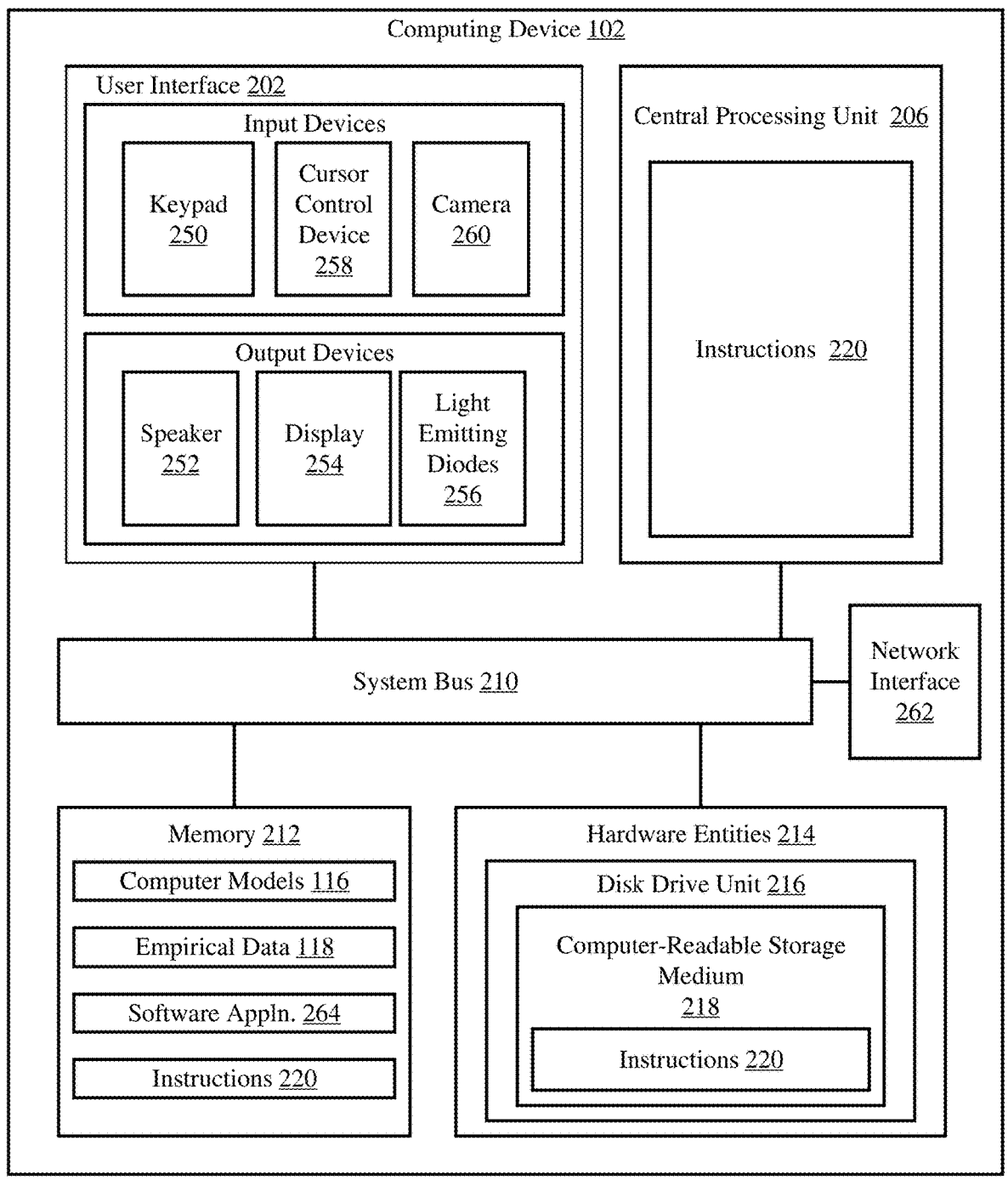
FIG. 2 is an illustration of an exemplary architecture for the computing device shown in FIG. 1.

Referring now to FIG. 2, there is provided an illustration of an illustrative architecture for the computing device 102. Notably, the computing device 102 may include more or less components than those shown in FIG. 2. However, the components shown are sufficient to disclose an illustrative embodiment implementing the present solution. The hardware architecture of FIG. 2 represents one embodiment of a representative computing device configured to facilitate the generation of an optimized surface texture of a substrate. As such, the computing device 102 of FIG. 2 implements at least a portion of a method for providing such an optimized surface texture in accordance with the present solution.

Some or all the components of the computing device 102 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 102 comprises a user interface 202, a Central Processing Unit ("CPU") 206, a system bus 210, a memory 212 connected to and accessible by other portions of computing device 102 through system bus 210, and hardware entities 214 connected to system bus 210. The user interface can include input devices (e.g., a keypad 250, a cursor control device 258, and/or a camera 260) and output devices (e.g., a speaker 252, a display 254, and/or light emitting diodes 256), which facilitate user-software interactions for controlling operations of the computing device 102.

At least some of the hardware entities 214 perform actions involving access to and use of memory 212, which can be a Random Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media. The term "machine-readable media", as used here, refers to a single medium or multiple media (e.g., a centralized or distributed database, and/or associated caches and RPUs) that store the one or more sets of instructions 220. The term "machine-readable media", as used here, also refers to any medium that is capable of storing, encoding or carrying a set of instructions 220 for execution by the computing device 102 and that cause the computing device 102 to perform any one or more of the methodologies of the present disclosure.

In some scenarios, the hardware entities 214 include an electronic circuit (e.g., a processor) programmed for facilitating the provision of an optimized surface texture for a substrate. In this regard, it should be understood that the electronic circuit can access and run a software application 264 installed on the computing device 102. The software application 324 is generally operative to facilitate the generation of an optimized surface texture for a substrate. Other functions of the software application 264 will become apparent as the discussion progresses.

The software application 264 implementing the present solution described herein is stored as a software program in a computer-readable storage medium and is configured for running on the CPU 206. Furthermore, software implementations of the present solution can include, but are not limited to, distributed processing, component/object distributed processing, parallel processing, and/or virtual machine processing. In the various scenarios, a network interface device 262 connected to a network environment communicates over the network using the instructions 220.

Figure 3:
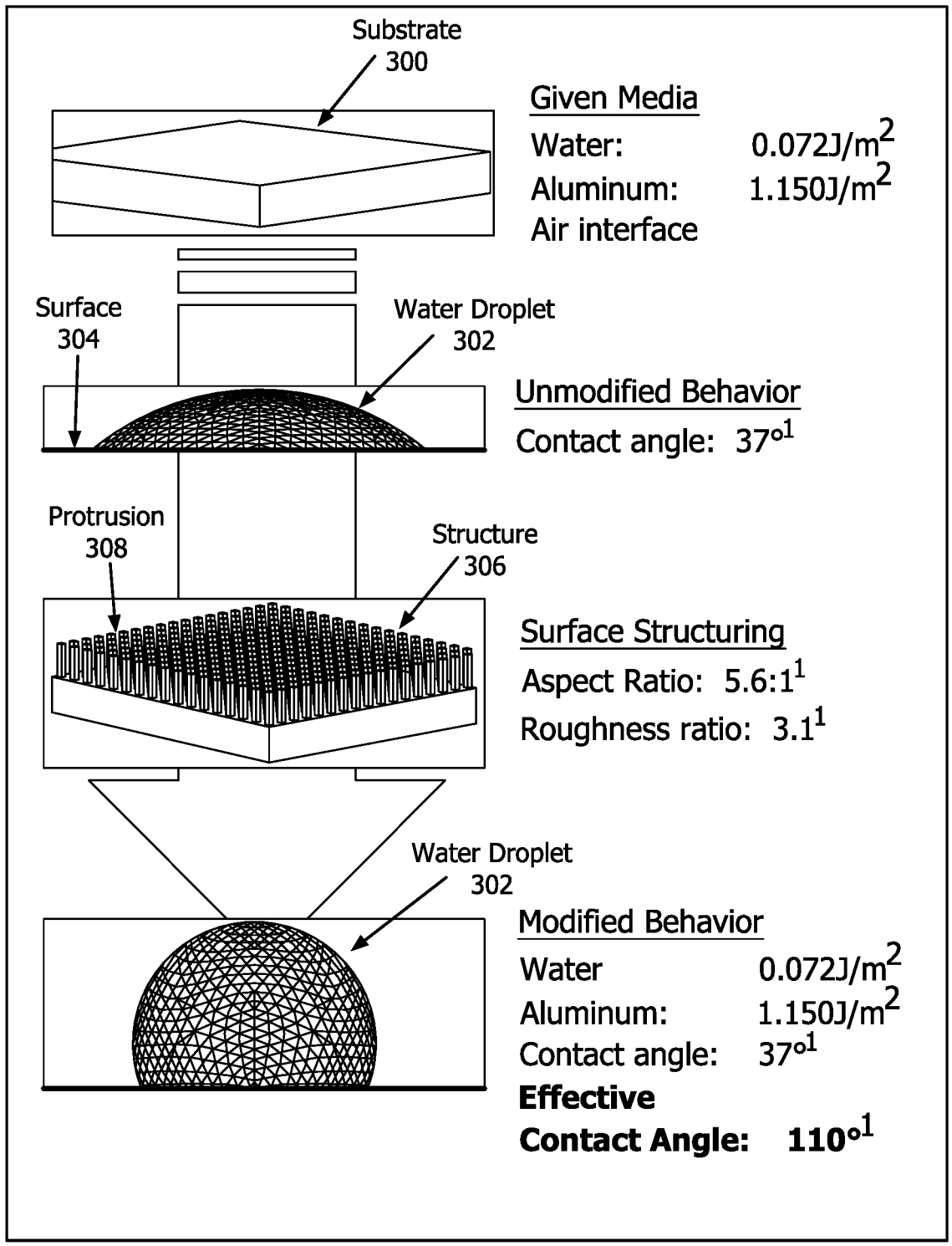
FIG. 3 is an illustration that is useful for understanding operations of a surface optimization system.

Referring now to FIG. 3, there is provided an illustration that is useful for understanding operations of the SOS 100 (and more particularly computing device 102 running software application 264). Given a smooth planar aluminum substrate 300 on which pure water droplets 302 are disposed, a contact angle of 37° is formed between each water droplet 302 and a top surface 304 of the substrate 300. In effect, the water droplets 302 readily wt the surface 304. The top surface 304 can be textured to increase or decrease the contact angle. For example, the top surface 304 is textured to include structure 306 without changing the bulk properties (e.g., surface energy) of the aluminum substrate 300. Structure 306 is shown in FIG. 3 as comprising a grid of equally spaced apart protrusions 308. The present solution is not limited in this regard. The structure 306 and/or elements thereof can have any shape and/or design in accordance with a particular application (e.g., a wavy design, a linearly spaced apart groove design, a dimple grid design, etc.). The structure 306 is designed so that the contact angle is increased from 37° to 110°. In effect, the water droplets have a reduced contact area with the surface 304, and thus less readily wet the surface 304.

As noted above, the contact angle is increased in some scenarios via the surface texturing. For example, let us assume that a sensor interface is disposed in a hostile environment. Over time, the sensor interface becomes dirty to a point at which its operations are affected. It is dangerous to enter the hostile environment, and therefore the risk associated with manually cleaning the sensor interface is too great. Thus, the exposed surface of the sensor interface is textured to increase the contact angle and increase contact angle hysteresis such that water droplets roll off the surface taking surface contaminates therewith. Consequently, the sensor interface remains relatively clean without human intervention. This is not the only scenario in which it may be desirable to increase the contact angle. In this regard, it should be appreciated that an air layer is trapped between the substrate and water. The air layer (or barrier) can significantly reduce drag against a substrate's surface. This is desirable in airplane wing applications, boat hull applications, propeller blade applications, and internal pipe feature applications.

As noted above, the contact angle is decreased in some scenarios via the surface texturing. For example, let us assume that a sensor interface is disposed in a hostile environment. Over time, the sensor interface becomes dirty to a point at which its operations are affected. It is dangerous to enter the hostile environment, and therefore the risk associated with manually cleaning the sensor interface is too great. Thus, the exposed surface of the sensor interface is textured to decrease the contact angle to less than or equal to 1° such that water collects on the surface so as to form a sheet of water taking dust particles off of the surface interface. Consequently, the sensor interface remains relatively clean without human intervention. This is not the only scenario in which it may be desirable to decrease the contact angle to less than or equal to 1°. In this regard, it should be appreciated that the sheet of water can significantly reduce drag against a substrate's surface. This is desirable in airplane wing applications, boat hull applications, propeller blade applications, and internal pipe feature applications.

Figure 4:
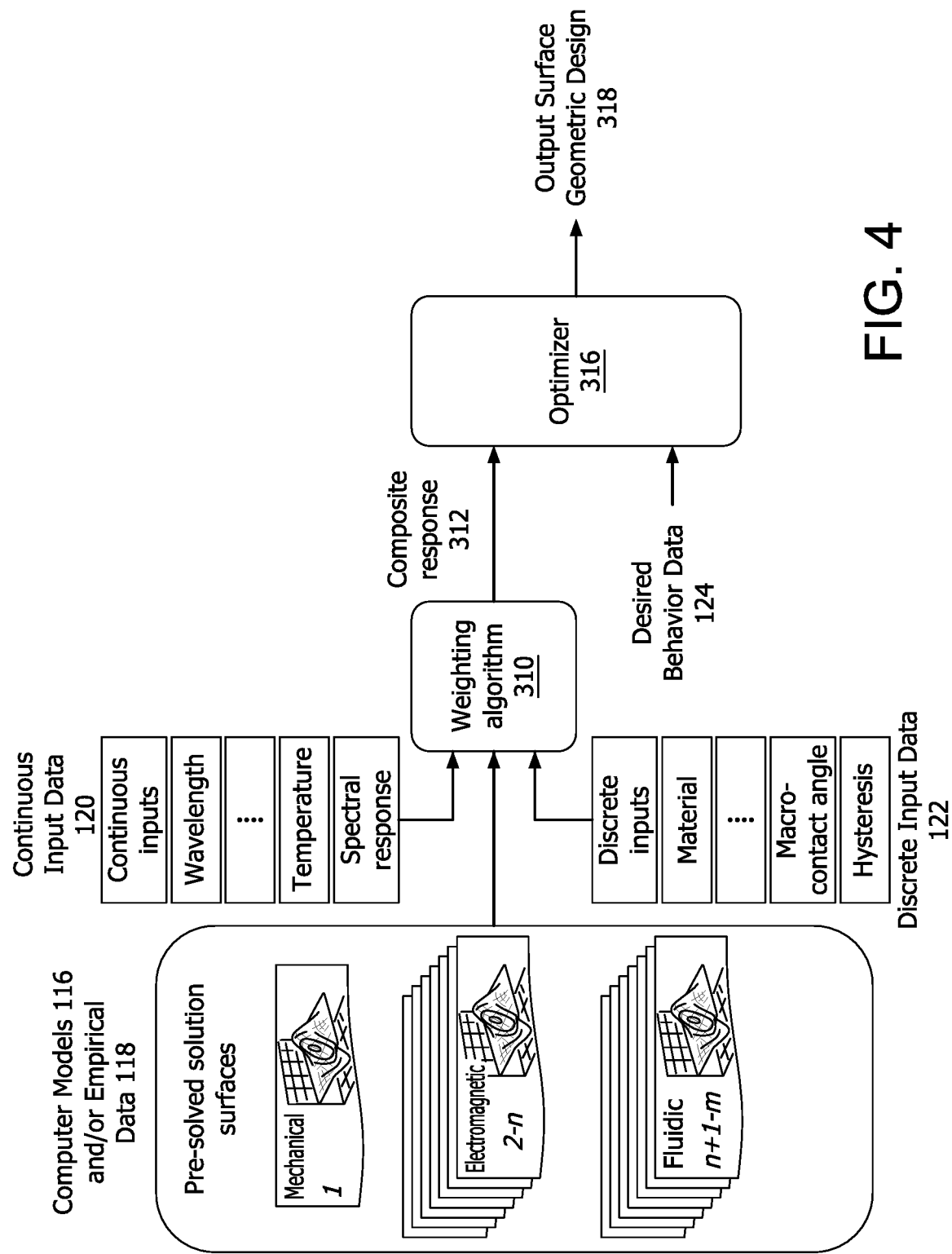
FIG. 4 is a diagram illustrating the wetting effects of an exemplary textured surface

Referring now to FIG. 4, there is provided an illustration that is useful for understanding how the structure of the surface texture is derived in accordance with the present solution. A weighting algorithm 310 and an optimizer 316 are used to generate an output surface geometric design 318. The weighting algorithm 310 and optimizer 316 are implemented as one or more software applications (e.g., software application 264 of FIG. 2) that is(are) able to run on or be executed by a computing device (e.g., computing device 102 of FIGS. 1-2). The output surface geometric design 318 specifies how a surface (e.g., surface 304 of FIG. 3) of a substrate (e.g., substrate 300 of FIG. 3) is to be textured by a surface texturing device (e.g., surface texturing device 108 of FIG. 1) so as to change an interaction between two materials.

During operation, certain information 116-122 is input into the weighting algorithm 310. This information comprises computer models 116 and/or empirical data 118. The computer models 116 may be obtained through use of a surface minimizing software application. The computer models 116 respectively indicate the mechanical properties of materials, as well as the electromagnetic and fluidic interactions between two materials. The empirical data 118 is obtained from laboratory experiments. The empirical data 118 also describes the behavior of interactions between two materials (fluid and/or solid materials).

Figure 5:
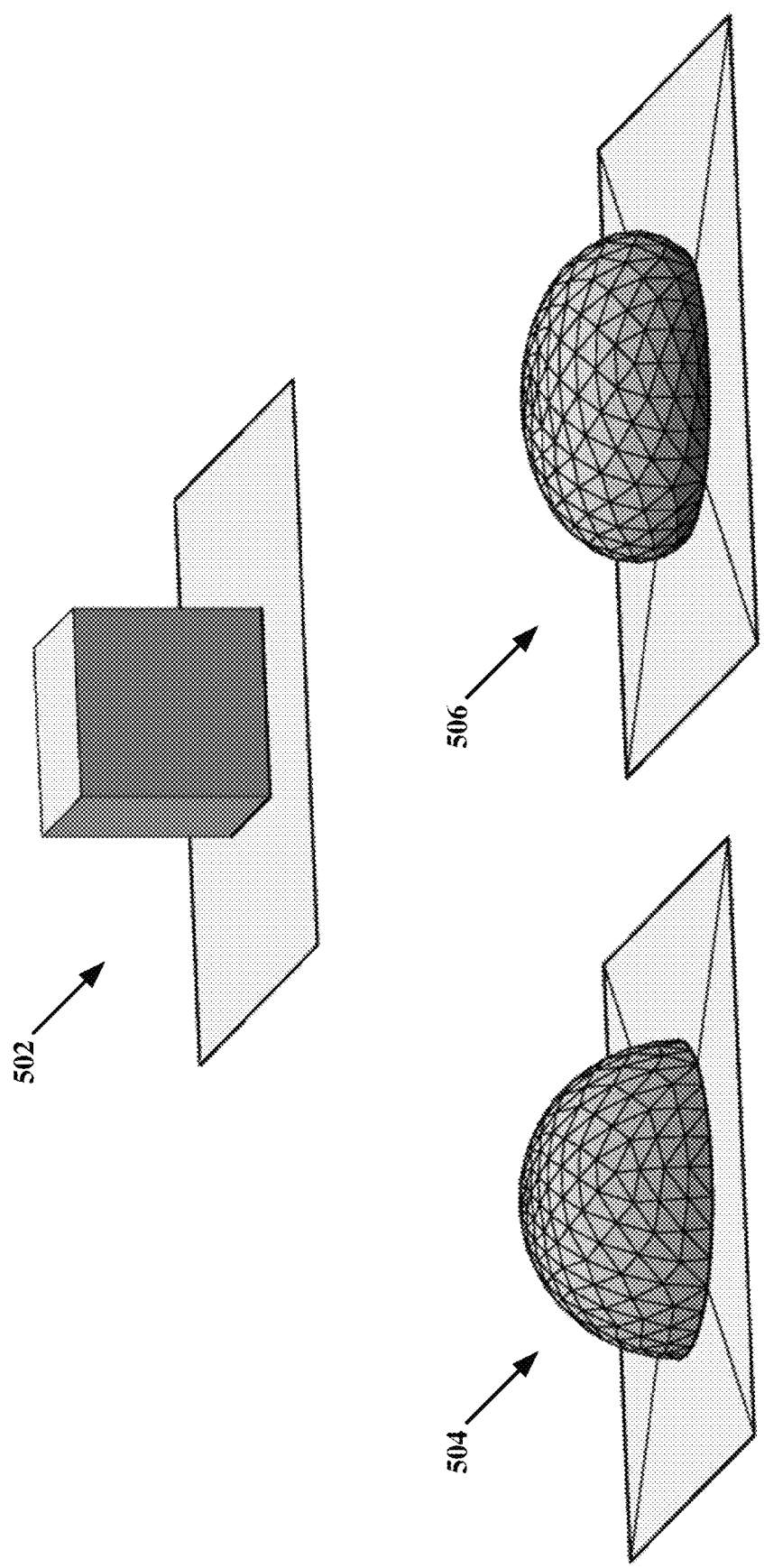
FIG. 5 is a flow diagram of an exemplary method for determining and outputting an optimized surface texture.
Figure 6:
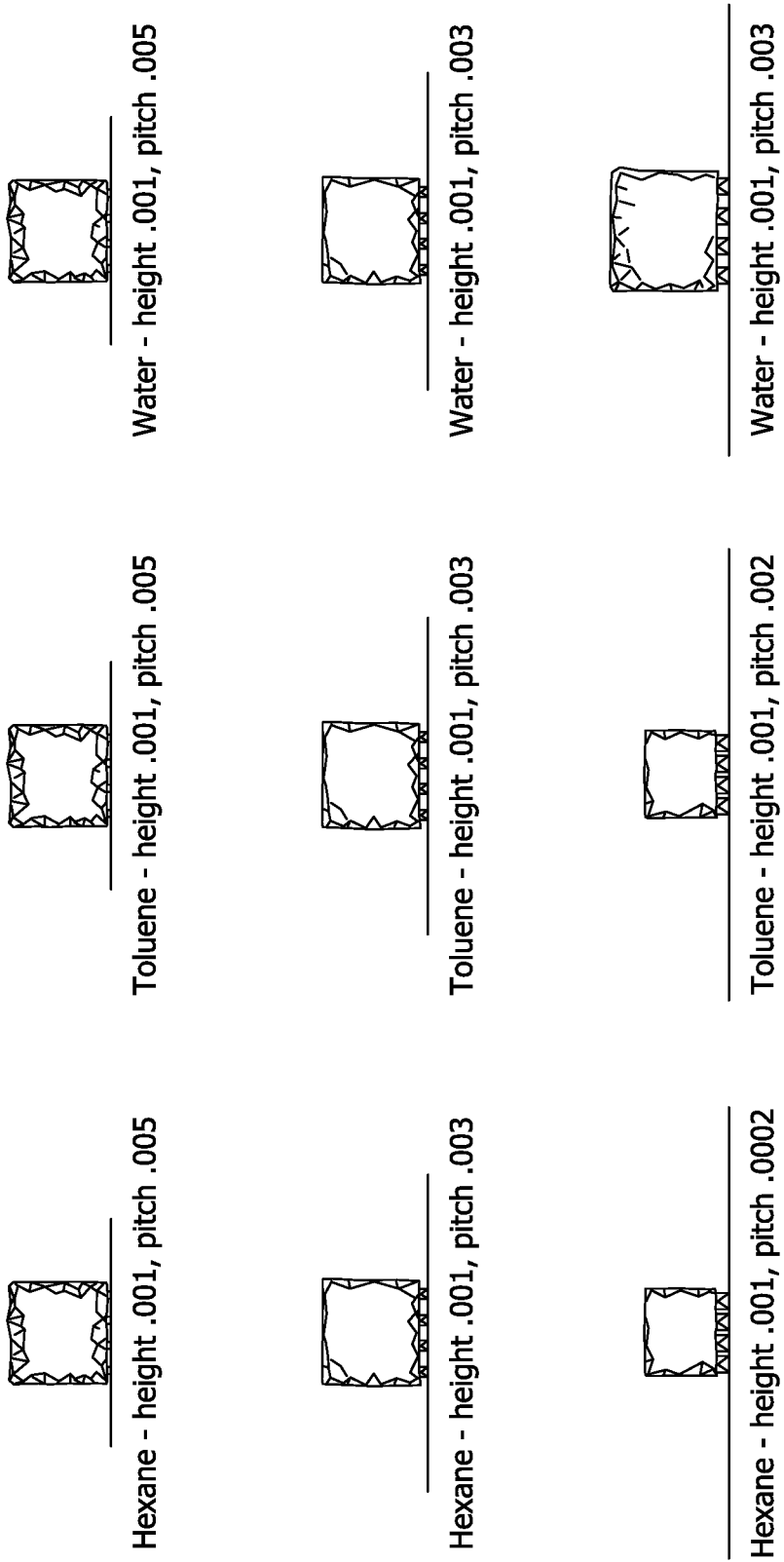
FIG. 6 provides illustrations of exemplary fluids.

In some scenarios, the surface minimizing software application comprises Surface Evolver, which is referenced above. Surface Evolver is a software program that models behavior of interactions between two materials (fluid and/or solid materials). More particularly, Surface Evolver is an interactive program for the modeling of liquid surfaces shaped by various forces and constraints. A liquid surface is implemented as a simplicial complex (i.e., a set composed of points, line segments, triangles, and their n-dimensional counterparts). The liquid surface evolves towards minimal energy by a gradient descent method. Illustrative Surface Evolver surfaces are shown in FIG. 5. The first image 502 is of a plane surface formed of a given material (e.g., aluminum) as defined in a datafile (before evolution) interacting with a droplet of water. The other images 504, 506 are evolved. The images 502-502 show a droplet on the plane surface with gravity and surface contact energy. Image 504 has no gravity and a 90° contact angle. Image 506 has gravity 5 (in dimensionless units) and a 135° contact angle. The present solution is not limited to the particulars of this Surface Evolver example. For example, other computer models illustrate how light interacts with a plane surface formed of a given material (e.g., silicon).

Referring again to FIG. 4, the information provided to the weighting algorithm also comprises continuous input data 120 and discrete input data 122 specifying the desired characteristics of the substrate and material interactions. In this regard, the continuous input data 120 are potentially changing environmental characteristics that (a) the textured substrate may be continuously subjected to during its use and (b) have a range over which the response is to apply. These environmental characteristics include, but are not limited to, wavelength, humidity, temperature, chemical, pressure, and/or spectral response. The continuous input data 120 specifies ranges of values for each environmental character (e.g., a range of temperature (e.g., −12° C. to +60° C.), a range of wavelengths (e.g., 10-50 nanometers), etc.).

The discrete input data 122 specifies parameters of the substrate surface to be textured. These parameters include, but are not limited to, substrate material type (e.g., 300 series stainless steel), substrate size, substrate cross-sectional shape, substrate overall thickness, configuration, macro-contact angle, and/or contact angle hysteresis (e.g., 5 degrees).

In some scenarios, the data 120, 122 is input by a user via an input device (e.g., keypad 250 of FIG. 2 and/or cursor control device 258 of FIG. 2). In other scenarios, at least a portion of the continuous input data 120 is obtained using sensor data (e.g., sensor data 114 of FIG. 1) which has been collected over time by sensors (e.g., sensors 104 of FIG. 1) disposed in an environment within which the textured substrate is to be used. The sensor data is analyzed by the computing device to identify ranges of values for one or more types of continuous input data.

The weighting algorithm 310 uses this information 120-122 to transform the computer models 116 and/or empirical data 118 into a composite response surface 312. The composite response surface 312 is generally the weighted combination of all of the pre-solved solution surfaces (specified by the computer models 116 and/or empirical data 118) based on the discrete and continuous inputs. Accordingly, this transformation is achieved by: analyzing the computer models 116 and/or empirical data 118 to identify potential solution surfaces based on the received discrete and continuous inputs; and determining the composite response surface 312 (which best accommodates the various inputs and potential surfaces) using the identified solution surfaces and weighted discrete and continuous input data. The weighting sets the relative importance of each type of discrete and continuous input data (e.g., wavelength, temperature, spectral response, material type, macro-contact angle, hysteresis, etc.). Alternatively or additionally, a user reviews and ranks the discrete and continuous input data as part of the weighing process. The weighting algorithm may also be iteratively performed.

In some scenarios, the weighting algorithm is defined by the following Mathematical Equation (1).

$$\forall \text{ response surfaces } S_{Mechanical}, S_{Electromagnetic}, \text{ and } S_{Fluid} \text{ and } \forall \text{ weighting factors } \lambda \text{ where } \sum_{l=1}^{m} \lambda_l = 1 \quad (1)$$

$$\exists \text{ composite surface } S_{composite} \ni S_{composite} = \lambda_1 S_{Mechanical} + \sum_{l=2}^{n} \lambda_l S_{Electromagnetic} + \sum_{l=n+1}^{m} \lambda_l S_{Fluid}$$

where $S_{Mechanical}$ represents a response surface modeling the mechanical behavior of a substrate, $S_{Electromagnetic}$ represents a response surface modeling the electromagnetic response of a substrate, and $S_{Fluid}$ represents a response surface modeling a fluids interaction with the substrate. $S_{composite}$ represents the composite response surface resulting from combining the models specifying a substrate's mechanical behavior, electromagnetic response, and interaction with a fluid. $\lambda$ represents a weighting factor, n is a total number of response surfaces modeling the electromagnetic response of a substrate, and m is a total number of response surfaces modeling a fluids interaction with the substrate. For all pre-solved mechanical, n−1 electromagnetic, and m−n−1 fluid response surfaces and m weighting factors that sum to unity, there exists a composite surface that such the composite surface is the weighted sum of the response surfaces. Composite pre-solved fluid and electromagnetic responses to a defined mechanical surface texture are weighted appropriately in accordance with Mathematical Equation (1). An example would be three different fluid (water, N-hexane, and toluene) responses to square-pillared textured surface demonstrating superhydrophobic behavior (water) and complete wetting of the surface by the other fluids. Pillar spacing is at 1×, 2× and 3× for comparison across fluids.

The composite response 312 is then provided to the optimizer 316. Desired behavior data 124 is also input into the optimizer 316. The desired behavior data is input by a user via an input device (e.g., keypad 250 of FIG. 2 and/or cursor control device 258 of FIG. 2). The desired behavior data 124 includes, but is not limited to, (a) first data indicating whether a surface that is hydrophobic, hydrophilic, superhydrophobic, superhydrophilic, oleophobic, oleophilic, superoleophobic, superoleophilic, lyophobic, lyophilic, superlyophobic, superlyophilic, (b) second data indicating whether the surface has high reflectivity or low reflectivity, and/or (c) third data indicating a desired contact angle hysteresis.

The optimizer 316 analyzes the inputs 124, 312 to determine an optimized surface geometric design 318. In some scenarios, the optimizer 316 comprises a Hooke and Jeeves optimizer, Hill Climb optimizer or pattern search optimizer. Each of the listed types of optimizers are well known in the art, and therefore are not described here. Still, it should be noted that these types of optimizers (a) do not require that the gradient of the problem space be optimized and (b) work on non-continuous or differentiable functions.

The optimized surface geometric design 318 represents the best fit for the desired behaviors specified by data 124 with minimum alterations to the bulk material structure (e.g., bulk aluminum sheet). For example, the optimizer 316 may have received data regarding an aluminum surface exposed to water at an air interface. Through optimizing, it is determined that the optimum surface texture to achieve a higher water contact angle (e.g., 110°) is some form of etching which produces micro or nano sized projections 308 on the surface 304, as shown in FIG. 3. The high contact angle hysteresis offers improved water "stickiness" to the textured surface. The present solution is not limited to the particulars of this example. Alternatively or additionally, the texturing can include, but is not limited to, wavy or serpentine lines, straight lines, parallel lines, perpendicular lines forming a grid pattern, angled lines (i.e., adjacent lines with an angle therebetween that is less than 90° relative to each other), dimples, continuous lines, broken lines, projections/protrusions (having the same or different cross-sectional profiles (e.g., circles, squares, rectangles, ovals, hexagons, etc.), height and/or widths), and/or triangular ramps.

Techniques for optimizing composite responses are well known in the art, and therefore will not described in detail herein. Any known or to be known optimization technique can be used herein without limitation. For example, the optimizer comprises a Hooke and Jeeves optimizer, Hill Climb optimizer or pattern search optimizer. In some scenarios, the optimizer 316 is implemented as a software application that is executed by the computing device (e.g., computing device 102 of FIGS. 1-2).

Once the optimized surface geometric design 318 is determined, it is output to one or more of the output devices (e.g., printer 106 or surface texturing device 108 of FIG. 1). For example, the output may be to a display where the optimized surface geometric design 318 is reviewed and then stored such that it can be subsequently utilized to create manufacturing specifications for the device. Alternatively, the output may be directly to a surface texturing device, which then directly applies the optimized surface texture to the device.

All of the apparatus, methods, and algorithms disclosed and claimed herein can be made and executed without undue experimentation in light of the present disclosure. While the present solution has been described in terms of preferred embodiments, it will be apparent to those having ordinary skill in the art that variations may be applied to the apparatus, methods and sequence of steps of the method without departing from the concept, spirit and scope of the present solution. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the present solution as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for tailoring fluid and energy interaction through surface texturing, comprising:
   receiving, by a computing device, behavior input data specifying known or modeled interactions between a material and a plurality of pre-solved solution surfaces, discrete input data specifying parameters of a surface to be textured, and continuous input data specifying ranges of values for environmental characteristics that the surface is to be subjected to during use;
   transforming, by the computing device, the behavior input data into a composite response surface, the composite response surface comprising a weighted combination of potential solution surfaces that are identified from the plurality of pre-solved solution surfaces based on the discrete input data and the continuous input data;
   determining, by the computing device, an optimized surface texture for the surface based on the composite response surface and desired behavior data specifying a desired interaction between the material and the surface to be textured; and
   outputting the optimized surface texture so that the optimized surface texture is applied to the surface.

2. The method according to claim 1, wherein the behavior input data comprises at least one of a plurality of computer models and empirical data.

3. The method according to claim 1, wherein the continuous input data comprises sensor data generated by sensors disposed in an environment in which a textured substrate is to be used.

4. The method according to claim 1, wherein the weighted combination of the plurality of pre-solved solution surfaces is generated in accordance with mathematical equation $\forall$ response surfaces $S_{Mechanical}$, $S_{Electromagnetic}$, and $S_{Fluid}$ and $\forall$ weighting factors $\lambda$ where $\sum_{l=1}^{m} \lambda_l = 1$ $\exists$ composite surface $S_{composite} \ni S_{composite} =$ $$\lambda_1 S_{Mechanical} + \sum_{l=2}^{n} \lambda_l S_{Electromagnetic} + \sum_{l=n+1}^{m} \lambda_l S_{Fluid}$$

where $S_{Mechanical}$ represents a response surface modeling mechanical behavior of a substrate, $S_{Electromagnetic}$ represents a response surface modeling an electromagnetic response of the substrate, $S_{Fluid}$ represents a response surface modeling a fluid's interaction with the substrate, $S_{composite}$ represents the composite response surface resulting from combining models specifying the substrate's mechanical behavior, electromagnetic response, and interaction with a fluid, $\lambda$ represents a weighting factor, n is a total number of response surfaces modeling the electromagnetic response of the substrate, and m is a total number of response surfaces modeling the fluid's interaction with the substrate.

5. The method according to claim 1, wherein the optimized surface texture comprises a single level design or a multi-level design having a hierarchical architecture.

6. The method according to claim 1, wherein the surface texture penetrates only partially through a monolithic material.

7. The method according to claim 1, wherein the surface is retextured.

8. The method according to claim 1, wherein bulk properties of the substrate are unaffected by the application of the optimized surface texture to the surface.

9. The method according to claim 1, wherein the optimized surface texture changes a contact angle between a fluid and the surface.

10. A system, comprising:
    a processor; and
    a non-transitory computer-readable storage medium comprising programming instructions that are configured to cause the processor to implement a method for tailoring fluid and energy interaction through surface texturing, wherein when executed the programming instructions cause the processor to:
    receive behavior input data specifying known or modeled interactions between a material and a plurality of pre-solved solution surfaces, discrete input data specifying parameters of a surface to be textured, and continuous input data specifying ranges of values for environmental characteristics that the surface is to be subjected to during use;
    transform the behavior input data into a composite response surface, the composite response surface comprising a weighted combination of potential solution surfaces that are identified from the plurality of pre-solved solution surfaces based on the discrete input data and the continuous input data;
    determine an optimized surface texture for the surface based on the composite response surface and desired behavior data specifying a desired interaction between the material and the surface to be textured; and
    output the optimized surface texture so that the optimized surface texture is applied to the surface.

11. The system according to claim 10, wherein the behavior input data comprises at least one of a plurality of computer models and empirical data.

12. The system according to claim 10, wherein the continuous input data comprises sensor data generated by sensors disposed in an environment in which a textured substrate is to be used.

13. The system according to claim 10, wherein the weighted combination of the plurality of pre-solved solution surfaces is generated in accordance with mathematical equation $$\forall \text{ response surfaces } S_{Mechanical}, S_{Electromagnetic},$$
$$\text{and } S_{Fluid} \text{ and } \forall \text{ weighting factors } \lambda \text{ where } \sum_{l=1}^{m} \lambda_l = 1$$
$$\exists \text{ composite surface } S_{composite} \ni S_{composite} =$$
$$\lambda_1 S_{Mechanical} + \sum_{l=2}^{n} \lambda_l S_{Electromagnetic} + \sum_{l=n+1}^{m} \lambda_l S_{Fluid}$$

where $S_{Mechanical}$ represents a response surface modeling mechanical behavior of a substrate, $S_{Electromagnetic}$ represents a response surface modeling an electromagnetic response of the substrate, $S_{Fluid}$ represents a response surface modeling a fluid's interaction with the substrate. $S_{composite}$ represents the composite response surface resulting from combining models specifying the substrate's mechanical behavior, electromagnetic response, and interaction with a fluid, $\lambda$ represents a weighting factor, n is a total number of response surfaces modeling the electromagnetic response of the substrate, and m is a total number of response surfaces modeling the fluid's interaction with the substrate.

14. The system according to claim 10, wherein the optimized surface texture comprises a single level design or a multi-level design having a hierarchical architecture.

15. The system according to claim 10, wherein the surface texture penetrates only partially through a monolithic material.

16. The system according to claim 10, wherein the surface is retextured.

17. The system according to claim 10, wherein bulk properties of the substrate are unaffected by the application of the optimized surface texture to the surface.

18. The system according to claim 10, wherein the optimized surface texture changes a contact angle between a fluid and the surface.

* * * * *